US010078024B2

(12) United States Patent
Esteves et al.

(10) Patent No.: US 10,078,024 B2
(45) Date of Patent: Sep. 18, 2018

(54) SYSTEMS AND METHODS FOR DETECTION AND PROCESSING OF PRESSURE SIGNALS

(71) Applicant: Faraday&Future Inc., Gardena, CA (US)

(72) Inventors: Jorge Alejandro Esteves, West Covina, CA (US); Sean Mehdi Stone, Las Vegas, NV (US)

(73) Assignee: FARADY&FUTURE INC., Gardena, CA (US)

( * ) Notice: Subject to any disclaimer, the term of this patent is extended or adjusted under 35 U.S.C. 154(b) by 174 days.

(21) Appl. No.: 15/273,455

(22) Filed: Sep. 22, 2016

(65) Prior Publication Data

US 2017/0088067 A1 Mar. 30, 2017

Related U.S. Application Data

(60) Provisional application No. 62/234,322, filed on Sep. 29, 2015, provisional application No. 62/234,361, filed on Sep. 29, 2015.

(51) Int. Cl.
*G01L 5/00* (2006.01)
*G01L 25/00* (2006.01)

(52) U.S. Cl.
CPC ............ *G01L 5/0038* (2013.01); *G01L 25/00* (2013.01)

(58) Field of Classification Search
CPC .............................. G01L 5/0038; G01L 25/00
See application file for complete search history.

(56) References Cited

U.S. PATENT DOCUMENTS 5,826,909 A * 10/1998 Brommer ................ A63C 5/06 280/602

* cited by examiner

*Primary Examiner* — Robert Deberadinis

(74) *Attorney, Agent, or Firm* — Knobbe Martens Olson & Bear LLP

(57) ABSTRACT

A force responsive transducer is disclosed. The force responsive transducer can include a force conductive cover, a pretensioner, and a force sensitive resistor. The pretensioner can be located between the force conductive cover and the force sensitive resistor. An apparatus can include a plurality of force responsive transducers, wherein a first transducer and a second transducer are configured to control a window. Processing circuitry in communication with the force responsive transducers can be configured to repeatedly zero calibrate the force responsive transducers.

19 Claims, 6 Drawing Sheets

202a
203a
204a
102
A
B
203b
202b
102
204b 0.6" Fence Sensing Resistor
5vDC
ADC CH
502
ALL DOWN FSR
ALL DOWN FSR
FL UP FSR
FL DOWN FSR
FL UP FSR
FL DOWN FSR
LR UP FSR
LR DOWN FSR
RR UP FSR
RR DOWN FSR
5v
501
504
5v Regulator
12VDC
ADC
Microcontroller
Tx/Rx
Door Control Unit
500

SYSTEMS AND METHODS FOR DETECTION AND PROCESSING OF PRESSURE SIGNALS

CROSS REFERENCE TO RELATED APPLICATIONS

Any and all applications for which a foreign or domestic priority claim is identified in the Application Data Sheet as filed with the present application are hereby incorporated by reference under 37 CFR 1.57. This application claims the benefit of U.S. Provisional Application No. 62/234,322, filed Sep. 29, 2015, entitled "FORCE SENSITIVE TRANSDUCER." This application further claims the benefit of U.S. Provisional Application No. 62/234,361, filed Sep. 29, 2015, entitled "DETECTING AND PROCESSING PRESSURE SIGNALS." Each of the above-identified applications are hereby incorporated by reference in their entirety.

TECHNICAL FIELD

The described technology generated relates to input devices and, more specifically, to force sensitive transducer.

BACKGROUND

Transducers in automotive applications such as mechanical window control switches often are constrained by spatial restrictions accompanying their mechanical operation. Furthermore, known mechanical window control switches can be prone to maintenance issues and malfunctions specific to their mechanical mechanisms.

SUMMARY

The methods and devices of the described technology each have several aspects, no single one of which is solely responsible for its desirable attributes.

In one embodiment, an apparatus for receiving force input is described. The apparatus includes a flexible cover, a force sensitive resistor, and a compressible pretensioner located between the flexible cover and the force sensitive resistor. The flexible cover can include aluminum. The compressible pretensioner can include rubber. The force sensitive resistor can be in communication with window control circuitry. The apparatus can be configured to control the operation of a window of a vehicle.

In another embodiment, a force responsive transducer for controlling a window is described. The transducer includes a force conductive cover, a force sensitive resistor, and a pretensioner located between the force conductive cover and the force sensitive resistor. An apparatus can include a plurality of force responsive transducers, wherein a first transducer and a second transducer of the plurality of force responsive transducers are configured to control a window. The first transducer may be hingedly connected to the second transducer. At least one of the first transducer and the second transducer can be hingedly connected to an interior surface of a vehicle. Applying a force to the first transducer can cause the window to move in a first direction, and applying a force to the second transducer can cause the window to move in a second direction opposite the first direction. The first transducer can be operable by an occupant of the vehicle applying a downward force against the apparatus, and the second transducer can be operable by an occupant of the vehicle applying an upward force against the apparatus. The interior surface of the vehicle can include an interior surface of a door of the vehicle. The first transducer and the second transducer can be hingedly connected by a flexible joint. At least a portion of one of the first transducer and the second transducer can extend at least partially around the flexible joint, such that the resistance of the force sensitive resistor changes based on movement of the flexible joint.

In another embodiment, an apparatus is described. The apparatus includes one or more force sensitive transducers, and processing circuitry in communication with the one or more force sensitive transducers and configured to repeatedly zero calibrate the one or more force sensitive transducers. Each of the one or more force sensitive transducers can include a force sensitive resistor. The processing circuitry can be configure to receive a plurality of outputs from the force sensitive transducer and repeatedly zero calibrate the force sensitive transducer based on the plurality of outputs. The apparatus can include a plurality of force sensitive transducers. The repeated zero calibration of at least one transducer of the plurality of force sensitive transducers can be performed independently of the repeated zero calibration of at least one other transducer of the plurality of force sensitive transducers. The processing circuitry can be further configured to determine a force being applied to any of the one or more forces sensitive transducers.

BRIEF DESCRIPTION OF THE DRAWINGS

These drawings and the associated description herein are provided to illustrate specific embodiments of the invention and are not intended to be limiting.

DETAILED DESCRIPTION

Various aspects of the novel systems, apparatuses, and methods are described more fully hereinafter with reference to the accompanying drawings. Aspects of this disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the novel systems, apparatuses, and methods disclosed herein, whether implemented independently of or combined with any other aspect. For example, an apparatus may be implemented or a method may be practiced using any number of the aspects set forth herein. In addition, the scope is intended to encompass such an apparatus or method which is practiced using other structure, functionality, or structure and functionality in addition to or other than the various aspects set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to automotive systems and/or different wired and wireless technologies, system configurations, networks, including optical networks, hard disks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

A force sensitive transducer is disclosed. The force sensitive transducer can include a flexible cover, a pretensioner, and a force sensitive resistor such that typical constraints associated with mechanical switches can be reduced.

Figure 1:
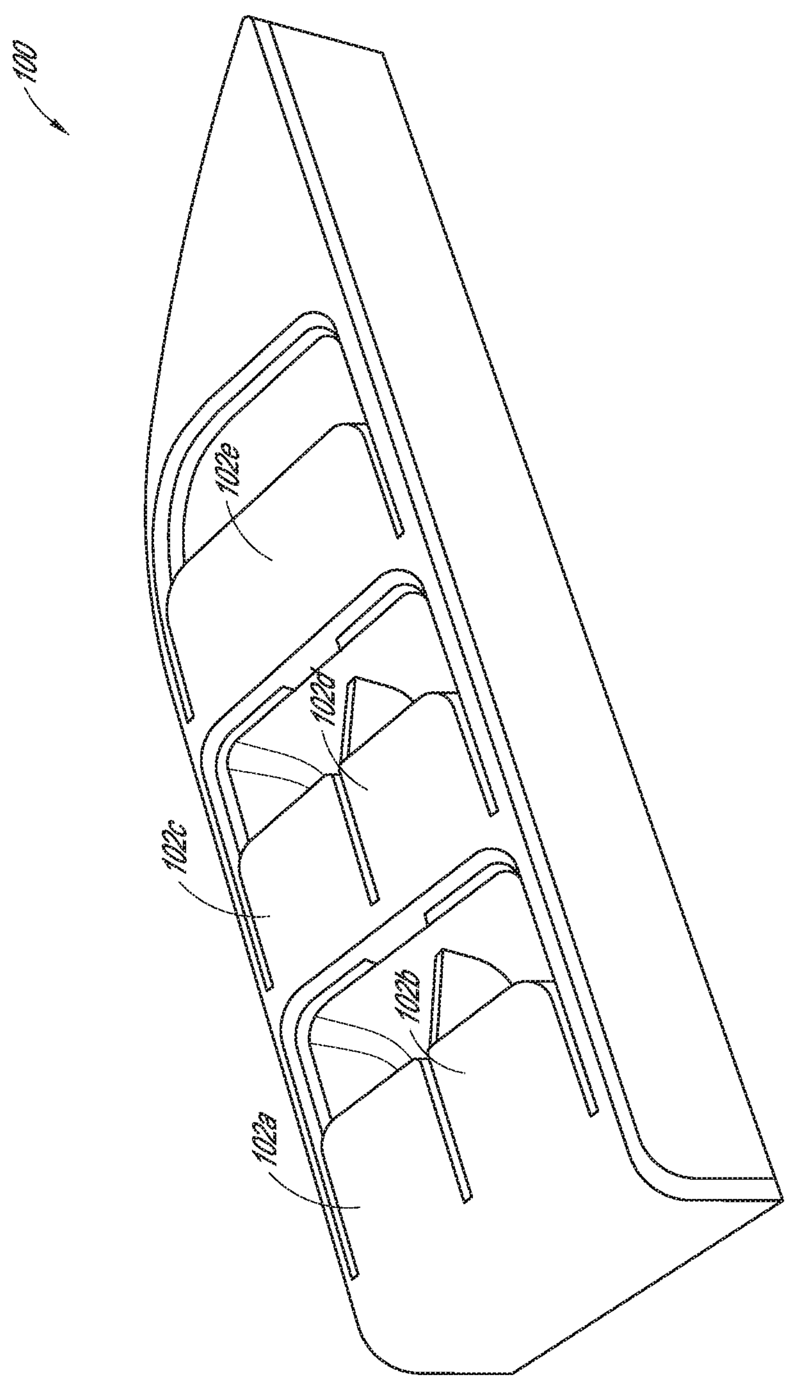
FIG. 1 is a first view of an example application of switches disclosed herein according to one embodiment.

FIG. 1 is a first view of an example application of transducers disclosed herein according to one embodiment. The illustrated example in FIG. 1 is a transducer or switch set 100 including a plurality of transducers or switches 102*a*, . . . , 102*e*, which are individually and collectively referred to herein as transducer(s) or switch(es) 102. The illustrated example switch set 100 can be implemented as window controllers in automobile applications. For example, the switch set 100 can be placed on or near the door of a driver's seat of a four-seat vehicle. In that example, each of the switches 102*a*, 102*b*, 102*c*, and 102*d* can be assigned to control a window of a corresponding seat, and the switch 102*e* can be assigned to control all the windows of the vehicle. As further described below in connection with FIGS. 2-4, the switch set 100 can include more switches not shown in FIG. 1. Further functional and structural details of the switches 102 are discussed in connection with FIGS. 2-4 below. As illustrated in FIGS. 1-4 and referred to in accompanying descriptions, same or similar notations or numerals of elements denote corresponding elements whose respective functions and characteristics are same, similar, or analogous in various implementations of the current disclosure.

Figure 2:
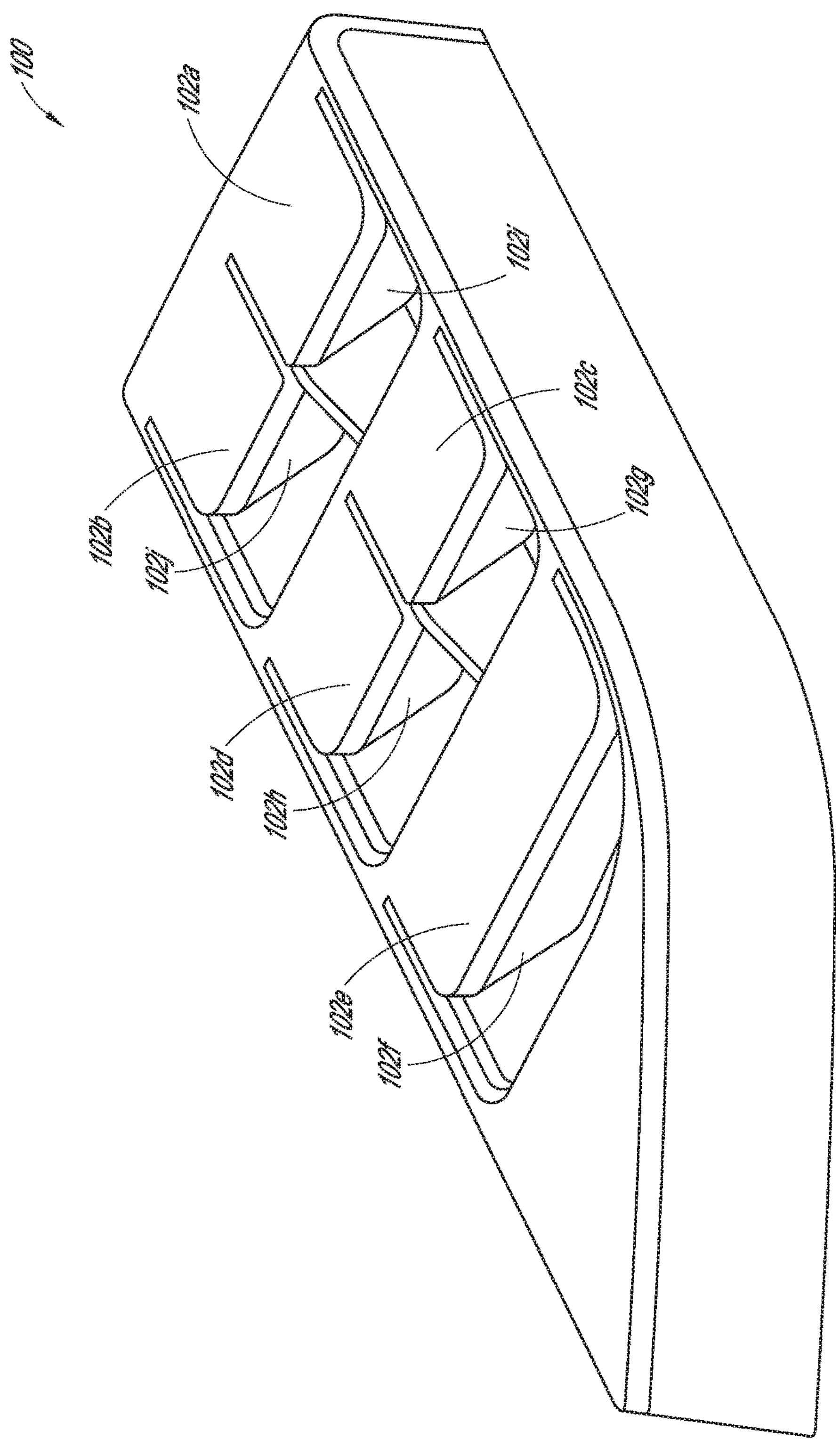
FIG. 2 is a second view of the example application of switches of FIG. 1.

FIG. 2 is a second view of the example application of switches of FIG. 1. As discussed above, the illustration of the example switch set 100 shows further plurality of transducers or switches 102*f*, . . . , 102*j*, which also are individually or collectively, along with the switches 102*a*, . . . , 102*e*, referred to herein as transducers or switches 102. Continuing with the example window controller discussed in connection with FIG. 1 above, the switch set 100 can be placed on or near the driver's seat, and each pair of switches (e.g., switches 102*a* and 102*i* as a pair, 102*b* and 102*j* as a pair, 102*c* and 102*g* as a pair, 102*d* and 102*h* as a pair, and 102*e* and 102*f* as a pair) can be configured to control a window of a seat. For instance, the switches 102*c* and 102*g* can be configured to control the window of the front-left seat (or driver's seat in certain instances), and in some embodiments, applying force to the switch 102*c* may open or roll down the window of the front-left seat, and applying force to the switch 102*g* may close or roll up the window of the front-left seat. In these embodiments, the opening and closing of other windows of a four-seat vehicle, for example, can each be similarly controlled by one of the switches 102 illustrated in FIG. 2. Also, in some embodiments, applying force to the switch 102*e* may open or roll down all the windows of the vehicle while applying force to the switch 102*f* may close or roll up all the windows of the vehicle.

In other embodiments, the one or more switches 102 can be applied to control other functionalities of the vehicle system that have been traditionally controlled with visible or perceivable mechanical input (e.g., mirror adjustments, door locks). As disclosed herein, it can be advantageous to remove mechanical features of a control transducer or switch so that the switch without mechanically moving parts may not be constrained by spatial limitations or suffer from potential issues specifically associated with mechanical components (e.g. mechanical malfunctions or wear and tear). Further details of the switches 102 are discussed in connection with FIGS. 3 and 4 below.

Figure 3:
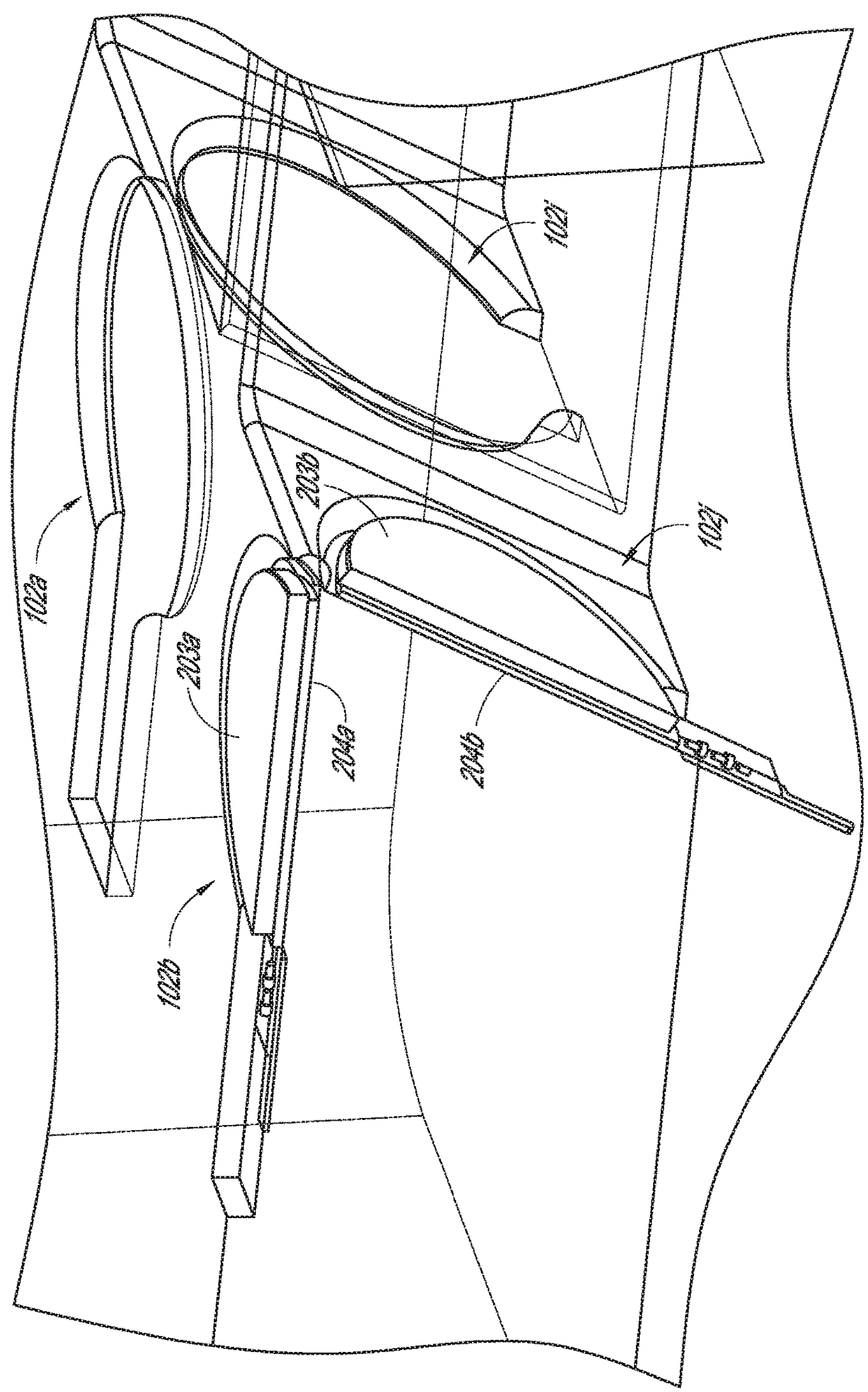
FIG. 3 is a perspective view of an exposed cross-section of an example switch disclosed herein according to one embodiment.

FIG. 3 is a perspective view of an exposed cross-section of an example switch set disclosed herein according to one embodiment. The illustrated view in FIG. 3 shows an exposed cross-section of the switches 102*b* and 102*j* of FIG. 2. As shown in FIG. 3, each of the switches (e.g., 102*b*, 102*j*) can have a cover (not shown, but shown in FIG. 4 and discussed further in connection with FIG. 4), a pretensioner 203 (e.g., 203*a*, 203*b*), and a force sensitive resistor 204 (e.g., 204*a*, 204*b*). FIG. 3 shows an exposed view that shows an example internal structure of the switches 102 without a cover. Also, shown in FIG. 3 are the slots or locations for the switches 102*a* and 102*i* in relation to the switches 102*b* and 102*j* according to FIGS. 1-2, and the internal elements of the switches 102*a* and 102*i* (e.g., their respective covers, pretensioners, and force sensitive resistors) are not shown in FIG. 3. As discussed above in connection with FIG. 2, in some embodiments, the switches 102*b* and 102*j* may function as a complementary pair so that the switch 102*b* can be configured to open or roll down a window next to a seat, and the switch 102*j* can be configured to close or roll up the window. Similarly, one or more switches 102 having similar internal structures as show in the example in FIG. 3 can be configured to control other functions of a vehicle. Further details of the cover, the pretensioner 203, and the force sensitive resistor 204 are discussed in connection with FIG. 4 below.

Figure 4:
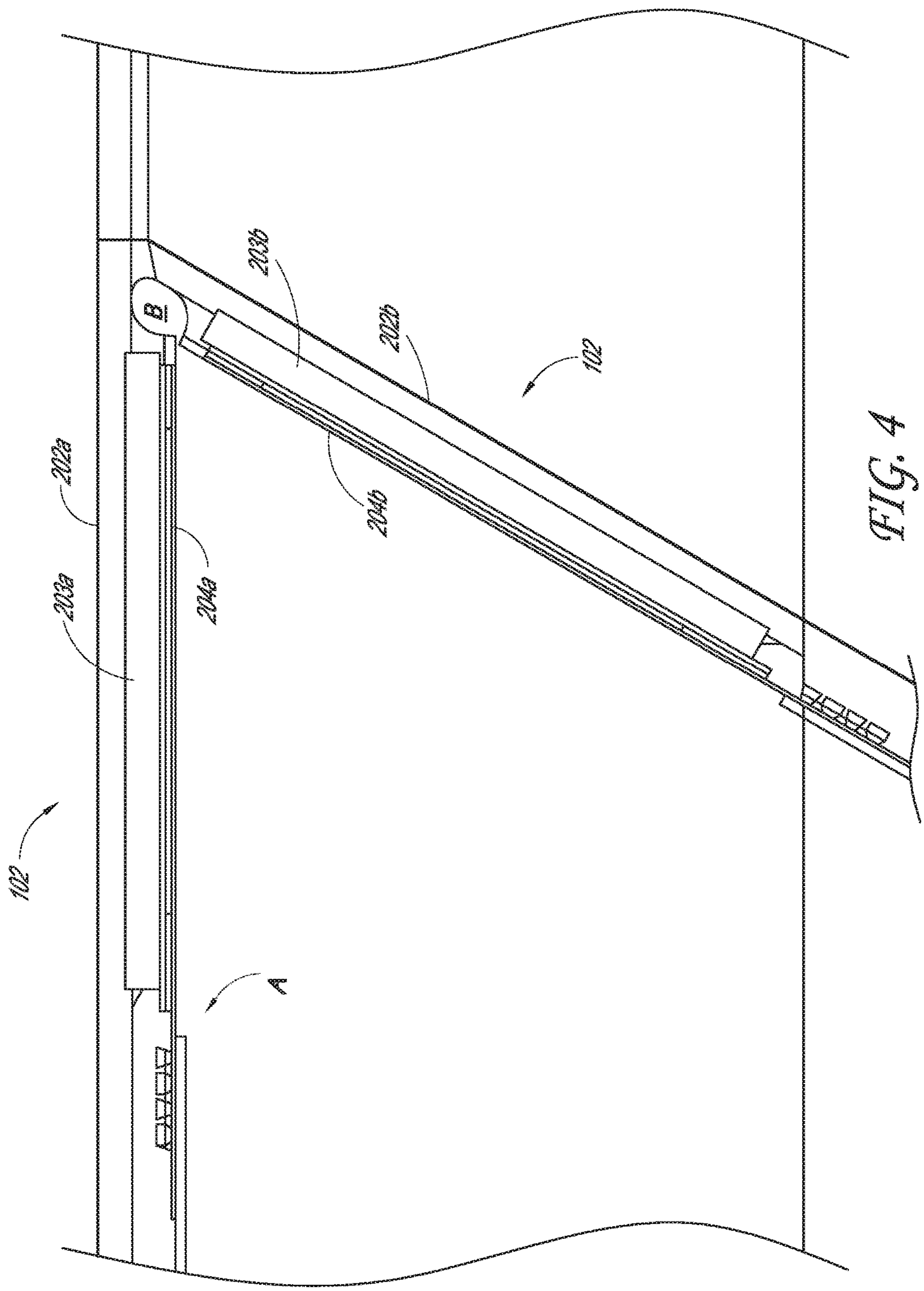
FIG. 4 is a cross-sectional view of the example switch of FIG. 3.

FIG. 4 is a cross-sectional view of an example switch disclosed herein according to one embodiment. As illustrated in the example in FIG. 4, each switch 102 may have a cover 202, the pretensioner 203, and the force sensitive resistor 204.

The cover 202 can be a cover of the switch 102 made of a flexible or force conductive material. As used herein "flexible" or "force conductive" generally refers to capable of conducting or transmitting at least varying magnitudes of a typical force or pressure input from a human finger regardless of whether the deformation of the material is perceptible to a human user of the switch. Commercially available force sensitive resistors have a very small actuation travel of less than 0.5 mm, in many cases less than 0.1 mm, with 0.05 mm travel being typical. Accordingly, in the area directly above the force sensitive switch, the cover should be flexible enough to deform 0.05 mm to 0.5 mm under a local force generated by and applied over an area of a human fingertip that is comfortable to human users, which will generally be something less than 2 pounds, or less than 1 pound. With a deformation of tenths of a millimeter, the deformation may be imperceptible to the user of the switch, but still sufficient to actuate it. In some embodiments, the cover 202 can be made of certain aluminum alloys, such as 3000 series aluminum, with the thickness of, for example, 0.016 inches. It will be appreciated that a wide variety of materials of metal, metal alloy, polymer, composite (plastic or otherwise), leather, fabric, glass, rubber, carbon fiber, etc. of a wide variety of thicknesses could be used to provide the appropriate flexibility depending on the bulk properties of the material, its thickness, its production method, the positioning of bends or supports near the switch, etc. For example, depending on the thickness and support structure of the cover 202, the flexible cover material be any grade of aluminum, including both lower elastic modulus 3000 series or the stiffer high elastic modulus 6000 or 7000 series aluminum alloys with a thickness that can range from about 0.016 inches to 0.063 inches. In other embodiments, other suitable materials and thickness can be used depending in part on the characteristics of the pretensioner 203 and the actuation sensitivity of the force sensitive resistor 204. In some embodiments, a plurality of the covers 202 of their respective switches 102 can be formed as a unibody enclosure such that the plurality of the covers 202 can be made from a single piece of a suitable cover material. For example, the respective covers of the switches 102*a*, . . . , 102*e* in FIG. 1 can be made from a single piece of aluminum. In another example, the respective covers of the pairs of the switches (e.g., the 102*b* and 102*j* pair in FIG. 3) can be made from a single piece of aluminum. Similarly any other contingent combinations of multiple covers 202 of multiple switches 102 can be made from a single piece of a suitable cover material. Implementing the cover 202 as disclosed herein can be advantageous as it can provide benefits in design and packaging.

The pretensioner 203 can be a normalizing material placed in between the cover 202 and the force sensitive resistor 204. The pretensioner 203 can be made of a compressible material capable of providing a normalized force on the force sensitive resistor 204. In some embodiments, the pretensioner 203 can be made of a material capable of providing a relatively constant force on the force sensitive resistor 204 and with, for example, a Durometer range of about 0 Shore A ("soft") to 70 Shore A ("medium hard"), such as rubber or rubber composites. The thickness of the pretensioner 203 can vary based on the design, structure, sensor sensitivities and other attributes of the transducer system. For example, the illustrated example can be implemented with rubber with the thickness of about ⅛ inch. It can be advantageous to place the pretensioner 203 between the force sensitive resistor 204 and the cover 202 to, for example, take account for manufacturing tolerances in the production and installation of the cover by adding a small initial force to the force sensitive resistor 204.

Each force sensitive resistor 204*a*, 204*b* can be a sensing element capable of generating an output in response to a force input. In some embodiments, the force sensitive resistor 204 can be implemented with the Force Sensing Resistor™ made by Interlink Electronics. For example, the force sensitive resistor 204*a*, 204*b* can be a variable resistor whose resistance changes according to the magnitude of force or pressure applied on the resistive sensing element (e.g., more force less resistance roughly in proportion within a sensitivity range). The use of the force sensitive resistor 204*a*, 204*b* can be advantageous in discerning differing degrees of force, which can be used for different control functionalities. In some embodiments, piezoelectric, piezoresistive, or other mechanical force sensitive elements can be used to receive a force input transferred from the cover 202, to the pretensioner 203, and to the force sensitive resistor 204*a*, 204*b*, which can be connected to one or more circuits, drivers, and/or processors (not shown) for processing force-corresponding data to be used in controlling various features of a vehicle (e.g. opening or closing of the windows). In some embodiments, the accompanying processing circuitry to the force sensitive resistor 204 can take account for long-term drift resulting from, for example, inherent sensor characteristics or normal wear and tear of surrounding materials (e.g., the pretensioner 203). Also, the accompanying circuitry to the force sensitive resistor 204 can be used to implement various advanced functionalities depending on the degree, duration, or pattern of one or more force inputs.

In some embodiments, one or more portions of the switch 102 may be movable, hinged, and/or capable of flexing. For example, joints A and B may be provided to allow some or all of the switch 102 to flex. The cover portions 202*a*, 202*b* may be formed from a single continuous piece of material. In such embodiments, the lower leg, including resistor 204*b*, may be able to flex about joint B independently of the upper leg, including resistor 202*a*. The entire switch 102, including resistors 204*a* and 204, may be able to flex together about joint A. Accordingly, a user may be able to actuate the switch 102 either by pressing down on the upper leg such that the switch 102 moves downward as a force is applied to resistor 204*a*, or by pulling up on the lower leg such that the switch 102 moves upward as a force is applied to resistor 204*b*. In addition, resistor 204*b* may be sized, shaped, and located such that the resistor 204*b* wraps around the joint B, and the resistance of resistor 204*b* can change as joint B flexes. Flexible implementations such as those described herein may be advantageous by providing an intuitive user interface, such as for the operation of a vehicle window control. In some embodiments, the operation of a mechanical window control switch may be emulated, such as for ease of operation and/or compliance with vehicle design regulations, while obtaining one or more advantages of the force sensitive transducers described herein.

Processing force input data based on normalized zero calibration value is disclosed. Circuitry accompanying one or more force sensitive transducers may process one or more of the readings of the force sensitive transducers to determine and update a zero calibration value and determine the status of the transducers based at least in part on a on a transducer output signal, a threshold value, and a zero calibration value.

Figure 5:
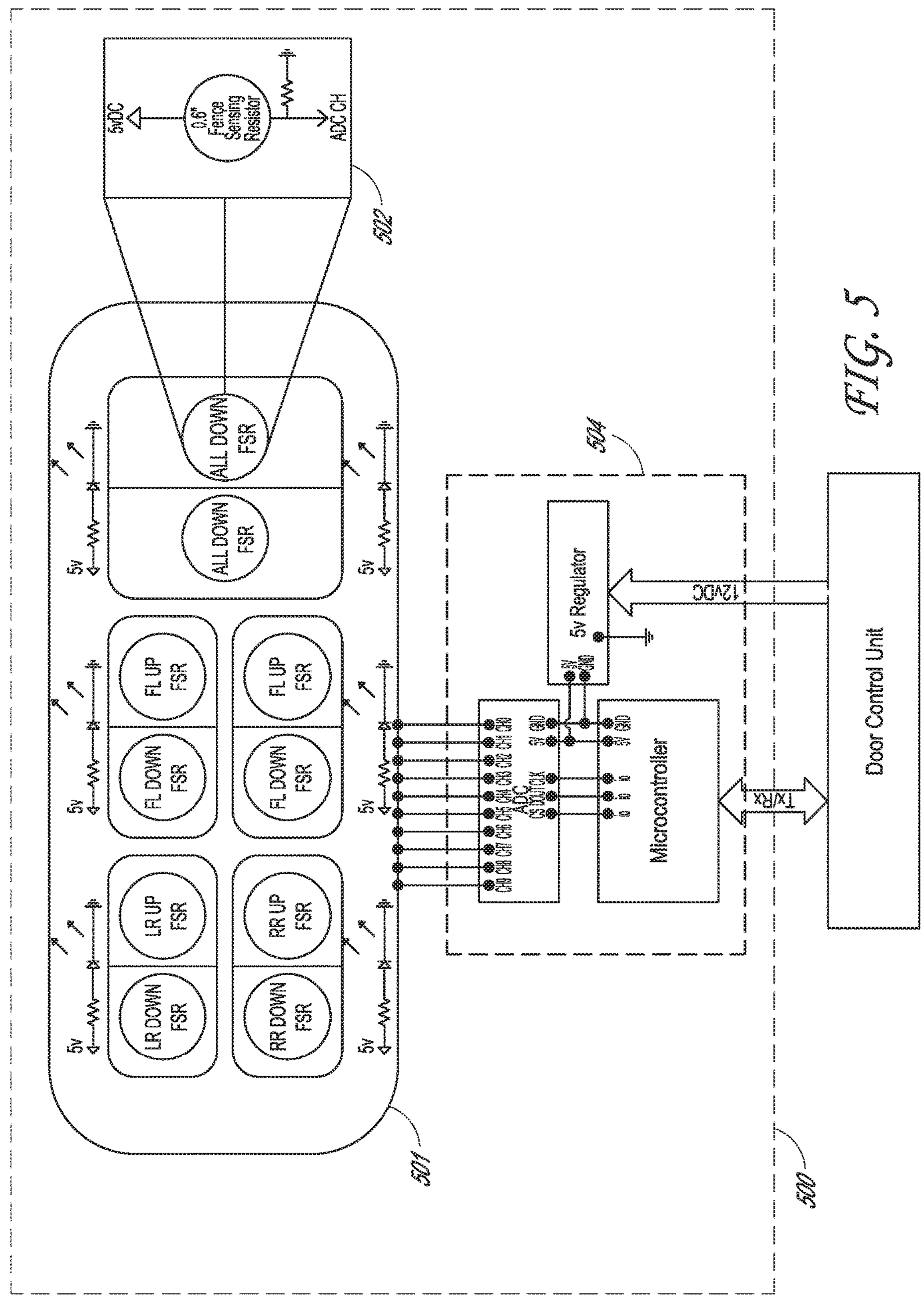
FIG. 5 is a block diagram illustrating an example pressure signal processing scheme according to one embodiment.

FIG. 5 is a block diagram illustrating an example force transducer signal processing apparatus according to one embodiment. The illustrated system 500 can be configured to acquire pressure input signals, from, for example, a finger of a user, and may include a pressure input interface 501, having a plurality of force sensitive transducers 502, and processing circuitry 504. The pressure input interface 501 can function in conjunction with mechanical or electromechanical parts of a system, such as a vehicle system. For example, the pressure input interface 501 can be configured to control opening (rolling down) or closing (rolling up) of one or more windows of a vehicle.

Each of the plurality of transducers 502 can be a force sensitive transducer, which includes a force input receiving mechanism and a force sensitive resistor. In some embodiments, the force input receiving mechanism may include a cover, such as a flexible metal cover (e.g., aluminum alloy), and a pretensioner made of compressible materials such as rubber. In some embodiments, the pretensioner can be located in between a cover and a force sensitive resistor, and the pretensioner can be made of materials capable of providing a biasing force on the force sensitive resistor of the transducer 502. In such embodiments, the pretensioner can provide a relatively constant force on the force sensitive resistor, and such embodiments can be further optimized to take account for manufacturing tolerances in the system as disclosed herein.

The processing circuitry 504 can be coupled to the pressure input interface 501 and configured to process signals from the pressure input interface 501. In some embodiments, the processing circuitry 504 can include an analog-to-digital converter (ADC), a processor (e.g. a microcontroller), a regulator, filters, or other circuit elements or data modules for processing the signals from the pressure input interface 501. Also in some embodiments, the processing circuitry 504 can be in communication with other one or more circuits, such as a door control unit, for powering up and sending and receiving the processed data of the pressure input interface 501. In some embodiments, additional elements, drivers, sensors, chips, or modules, such as a memory storage device (random-access memory, read-only memory, flash memory, or solid state storage (SSD)), not expressly illustrated in FIG. 1. In some embodiments, the processing circuitry 504 accompanying the pressure input interface 501 can take account for long-term drift resulting from, for example, inherent sensor characteristics or normal wear and tear of surrounding materials (e.g., the pretensioner). Also, the processing circuitry 504 can be used to implement various advanced functionalities depending on the degree, duration, or pattern of one or more force inputs.

Figure 6:
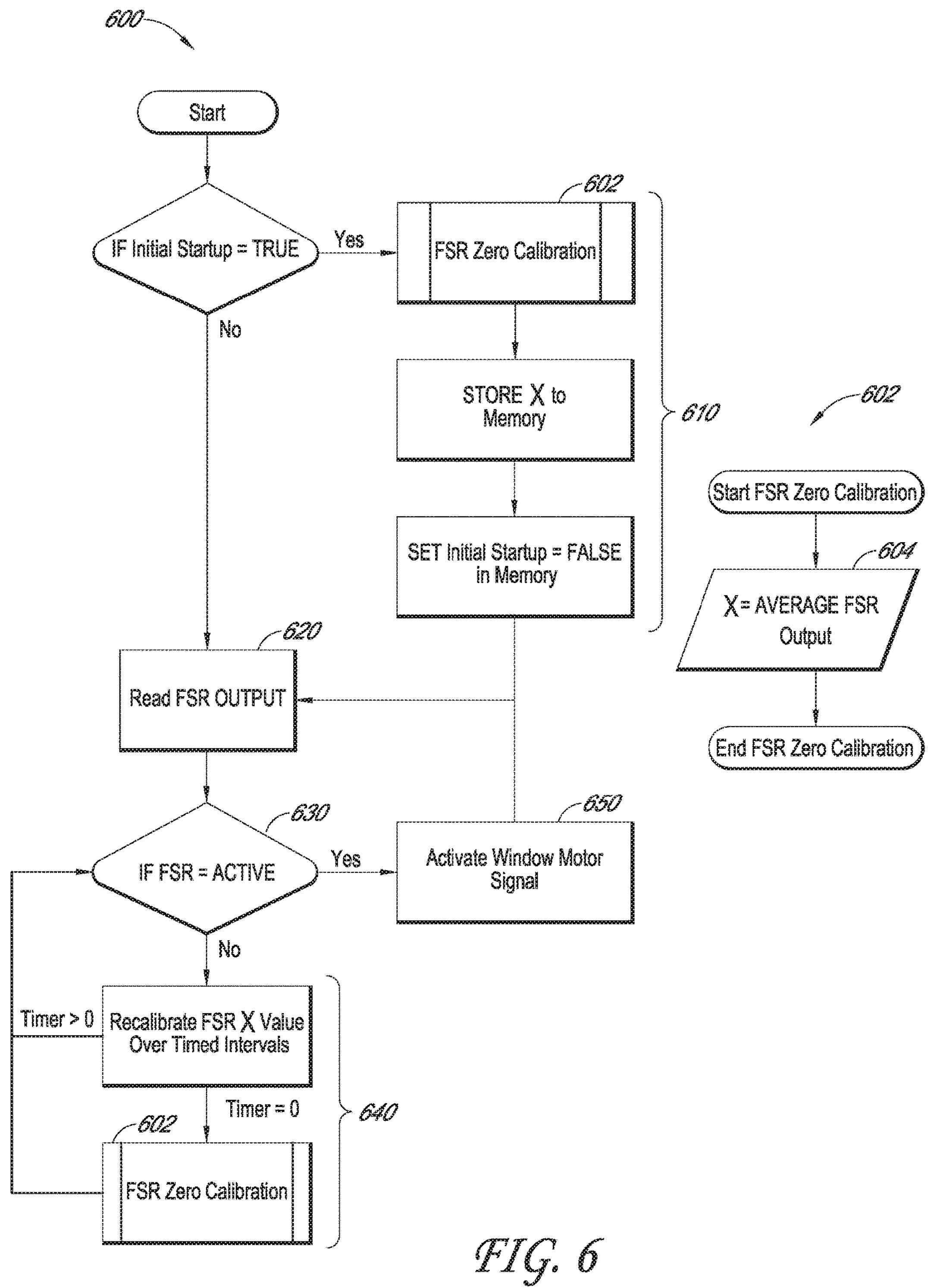
FIG. 6 is a flowchart showing an example process for pressure signal processing according to one embodiment.

FIG. 6 is a flowchart showing an example process for processing pressure signals according to one embodiment. The illustrated process 600 shows one example embodiment of the disclosure that includes calibration of the transducers 502 (FIG. 5). The one or more steps of the process 600 can be performed in part by and/or in conjunction with one or more elements (e.g., the microcontroller) illustrated and/or described in connection with FIG. 5 above. It is to be noted that all or parts of the steps in FIG. 6 may be concurrently, continuously, periodically, intermittently, repeatedly, or iteratively performed, and the illustrated process in FIG. 6 is only one example embodiment of the features disclosed herein.

The process 600 may begin with initialization 610, which may include a zero calibration process 602. As used herein, the term "zero calibration" refers to a determination of the transducer output in the absence of user applied pressure or other interaction with the transducer. Even in the absence of user pressure or interaction, the pretensioner, cover, and or other elements may place an inherent pressure on the transducer, which inherent pressure may change with environmental factors such as temperature or humidity or over time due to aging of materials used. When a pressure input acquisition system (e.g., 500 in FIG. 5) is first powered up, such as at initial manufacture or installation into a system, it can be indicated that the system is at its initial startup phase, and the initialization 610 may be performed. In one embodiment, during the initialization 610, the zero calibration process 602 can be performed, calibration data from the zero calibration process 202 can be stored, and the initial startup indicator can be updated.

According to one embodiment, during the zero calibration process 602, a plurality of outputs measured at a series of spaced apart times from a force sensitive resistor of the pressure input interface (e.g., 501 in FIG. 5) can be obtained. In some embodiments, a zero calibration value, which can be a reference value indicating no user caused pressure input, can be determined during initialization and repeatedly updated. For example, a zero calibration value can be an average of a certain number of outputs of the force sensitive resistor over a certain period of time. In implementing the zero calibration process 602 as SUCH, an average of 20 outputs from one force sensitive resistor can be computed. In other implementations, a specific time period (e.g., 3 seconds) can be set to take an average of the outputs taken during that time period (e.g. an output measurement is made every 150 milliseconds for three seconds and the output values taken in that three second period are averaged), which can depend from the clock and sampling frequencies of the processing circuitry 504, for example. In other embodiments, a different method of combining or processing a set of pressure sensor values can be implemented for the zero calibration process 602. One or more different statistical techniques can be used to determine and/or select the zero calibration value. For example, in some embodiments, the zero calibration process 602 can determine or obtain information (e.g., from other processors of the vehicle system) that certain pressure or force readings are anomalies, noise, or otherwise statistically irrelevant in setting the zero calibration value and the zero calibration process 602 may discard certain readings from the force sensitive resistor, for example. In processing multiple output values of the force sensitive resistor, other computations, such as weighted average can be implemented to determine the zero calibration value. Also in another embodiment, the zero calibration process 602 may be adaptable depending on the circumstances (e.g., taking a simple average as in step 604 in some iterations but taking a weighted average in other), and different considerations of the zero calibration may be in play, and the zero calibration during the initialization (e.g., 610) may be different from the zero calibration for periodic updates (e.g., 640) that follow.

It can be advantageous to implement the zero calibration process 602 and determine zero calibration value from a plurality of outputs from the force sensitive resistor as disclosed herein since the calibration process 602 may reduce the chance of false readings (e.g., incorrectly indicating "window open") and ameliorate effects of various environmental factors (e.g., heat) that may change properties, responses, and/or sensitivities of the pressure input interface 501 (FIG. 5), including the covers, pretensioners, and force sensitive resistors. Furthermore, as described below in connection with step 630, the variable and updatable zero calibration value, which can serve as a reference to the readings of the force sensitive resistors, can enhance the adjustability and modularity afforded in interpreting force inputs from a human user through, for example, one or more threshold values for "on" or "off" of the transducers.

When the system is not at startup after the system initialization is completed, the process 600 may proceed to step 620 to obtain the output from, for example, the pressure input interface 501 (FIG. 5). In some embodiments, the output from the pressure input interface 501 can be processed by one or more modules (e.g., ADC) illustrated and/or discussed in connection with FIG. 5 above. In embodiments processing the output from the pressure input interface 501 with and ADC, the digitized output values of the force sensitive resistors, for example, can be periodically available for the microcontroller to retrieve.

In step 630, the processor may determine whether the obtained output from the force sensitive resistor (of a transducer) indicates that a pressure input from a user is being applied. In some embodiments, one or more threshold values can be set, and the difference between the output from the force sensitive resistor and the zero calibration value (discussed above) can be compared with the one or more threshold values. For example, in some embodiments, a zero calibration value discussed above along with a current output measurement may indicate no force input received (e.g. the difference between the two is below a threshold), and if the current output reading of one of the force sensitive resistors exceeds the zero calibration value by a margin greater than a predetermined threshold value, the processor may determine that the transducer incorporating that particular force sensitive resistor is "on" as a meaningful human force input is received via the transducer. It is advantageous to implement the determination of force input as disclosed herein since the one or more threshold values can be adjustable depending on specific environmental conditions and can be modular for various different functions of the transducers and expected level of inputs to the transducers. Also, in embodiments having more than one transducers as a complementary set (e.g., windows up and down in two complementary switches), the step 630 may determine which of the complementary functionalities should be performed based one which of the transducers are "on." It is to be noted that determining whether to activate the assigned functionalities of the transducers can also depend on other additional determinations, such as whether the duration of the pressure input was long enough, whether the pressure input pattern was anomalous, and whether the one or more pressure inputs were inconsistent (e.g. both window up and down switches are "on"). If it is determined that the switch is on, the process 600 may proceed to step 650, and if it is determined that the switch is off, the process 600 may proceed to step 640.

When there is no indication of force input from a user, calibration update 640 can be performed. In some embodiments, the calibration update can be performed repeatedly and/or periodically to recalibrate the zero calibration value according to the process similar to the zero calibration process 602 discussed above. In some embodiments, a time period or a counter value (e.g., every 10,000 counts of a 30 Hz clock) can be set to update the zero calibration periodically when the counter reaches zero, where the counter is reset when the zero calibration procedure is completed. It is to be noted that the one or more of the steps 630 and 640 can be performed in parallel, in an interleaved or multiplexed manner, or using one or more functions such as an interrupt to allow repeated recalibration while the one or more transducers are idle and responsive receipt of pressure inputs if one is detected. If, for example, a valid force input (based on the most recent zero calibration value) is received during the recalibration period in step 640, the timer or counter value for the recalibration 640 can be temporarily stored until the processor can execute instructions responsive to the valid force input and return and resume the recalibration 640. In some embodiments, the time interval for recalibration may range from a few seconds up to several hours, with between 1 and 30 minutes, or between 2 and 10 minutes being suitable in some implementations, and depending on the specification of the vehicle system and environmental factors, the recalibration interval can be adjusted.

In step 650, the processing circuitry 504 may communicate with other circuits (e.g., the door control unit in FIG. 5) to indicate operation of the function assigned to the transducer that is "on" and is valid. For example, if it is determined that the transducer assigned to open or roll down the window next to the driver's seat, the processing circuitry 104 may send the door control unit (FIG. 5) to activate the window motor to open on the window next to the driver. It may be advantageous for the process of FIG. 6 to be performed independently for each of the transducers in an assembly such as shown in FIG. 5. This can help produce a consistent feel for a user when operating different ones of the switches. If different ones of the switches are affected differently over time and with environmental conditions, finding and using different zero point calibration values for each one can make each switch still respond with the same or at least similar user pressure.

The foregoing description and claims may refer to elements or features as being "connected" or "coupled" together. As used herein, unless expressly stated otherwise, "connected" means that one element/feature is directly or indirectly connected to another element/feature, and not necessarily mechanically. Likewise, unless expressly stated otherwise, "coupled" means that one element/feature is directly or indirectly coupled to another element/feature, and not necessarily mechanically. Thus, although the various schematics shown in the Figures depict example arrangements of elements and components, additional intervening elements, devices, features, or components may be present in an actual embodiment (assuming that the functionality of the depicted circuits is not adversely affected).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like. Further, a "channel width" as used herein may encompass or may also be referred to as a bandwidth in certain aspects.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules, and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The foregoing description and claims may refer to elements or features as being "connected" or "coupled" together. As used herein, unless expressly stated otherwise, "connected" means that one element/feature is directly or indirectly connected to another element/feature, and not necessarily mechanically. Likewise, unless expressly stated otherwise, "coupled" means that one element/feature is directly or indirectly coupled to another element/feature, and not necessarily mechanically. Thus, although the various schematics shown in the Figures depict example arrangements of elements and components, additional intervening elements, devices, features, or components may be present in an actual embodiment (assuming that the functionality of the depicted circuits is not adversely affected).

It is to be understood that the implementations are not limited to the precise configuration and components illustrated above. Various modifications, changes and variations may be made in the arrangement, operation and details of the methods and apparatus described above without departing from the scope of the implementations.

Although this invention has been described in terms of certain embodiments, other embodiments that are apparent to those of ordinary skill in the art, including embodiments that do not provide all of the features and advantages set forth herein, are also within the scope of this invention. Moreover, the various embodiments described above can be combined to provide further embodiments. In addition, certain features shown in the context of one embodiment can be incorporated into other embodiments as well.

What is claimed is:

1. An apparatus for receiving force input, the apparatus comprising:

a flexible cover;

a force sensitive resistor; and a compressible pretensioner located between the flexible cover and the force sensitive resistor.

2. The apparatus of claim 1, wherein the flexible cover comprises aluminum.

3. The apparatus of claim 1, wherein the compressible pretensioner comprises rubber.

4. The apparatus of claim 1, wherein the force sensitive resistor is in communication with window control circuitry.

5. The apparatus of claim 4, wherein the apparatus is configured to control the operation of a window of a vehicle.

6. An apparatus for controlling a window comprising:

a first force responsive transducer; and a second force responsive transducer, wherein the first force responsive transducer and the second force responsive transducer each comprise:

a force conductive cover;

a force sensitive resistor; and a pretensioner located between the force conductive cover and the force sensitive resistor.

7. The apparatus of claim 6, wherein the first transducer is hingedly connected to the second transducer.

8. The apparatus of claim 7, wherein at least one of the first transducer and the second transducer is hingedly connected to an interior surface of a vehicle.

9. The apparatus of claim 8, wherein applying a force to the first transducer causes the window to move in a first direction, and wherein applying a force to the second transducer causes the window to move in a second direction opposite the first direction.

10. The apparatus of claim 8, wherein the first transducer is operable by an occupant of the vehicle applying a downward force against the apparatus, and wherein the second transducer is operable by an occupant of the vehicle applying an upward force against the apparatus.

11. The apparatus of claim 8, wherein the interior surface of the vehicle comprises an interior surface of a door of the vehicle.

12. The apparatus of claim 7, wherein the first transducer and the second transducer are hingedly connected by a flexible joint.

13. The apparatus of claim 12, wherein at least a portion of one of the first transducer and the second transducer extends at least partially around the flexible joint, such that the resistance of the force sensitive resistor changes based on movement of the flexible joint.

14. An apparatus comprising:

one or more force sensitive transducers; and processing circuitry in communication with the one or more force sensitive transducers and configured to repeatedly zero calibrate the one or more force sensitive transducers.

15. The apparatus of claim 14, wherein each of the one or more force sensitive transducers comprises a force sensitive resistor.

16. The apparatus of claim 14, wherein the processing circuitry is configured to receive a plurality of outputs from the force sensitive transducer and repeatedly zero calibrate the force sensitive transducer based on the plurality of outputs.

17. The apparatus of claim 14, wherein the apparatus comprises a plurality of force sensitive transducers.

18. The apparatus of claim 17, wherein the repeated zero calibration of at least one transducer of the plurality of force sensitive transducers is performed independently of the repeated zero calibration of at least one other transducer of the plurality of force sensitive transducers.

19. The apparatus of claim 14, wherein the processing circuitry is further configured to determine a force being applied to any of the one or more force sensitive transducers.

* * * * *